(12) United States Patent
Finkenzeller

(10) Patent No.: US 10,914,347 B2
(45) Date of Patent: Feb. 9, 2021

(54) CLUTCH SYSTEM

(71) Applicant: Schaeffler Technologies AG & Co. KG, Herzogenaurach (DE)

(72) Inventor: Marc Finkenzeller, Gengenbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 233 days.

(21) Appl. No.: 16/088,863

(22) PCT Filed: Apr. 10, 2017

(86) PCT No.: PCT/DE2017/100287
§ 371 (c)(1),
(2) Date: Sep. 27, 2018

(87) PCT Pub. No.: WO2017/182034
PCT Pub. Date: Oct. 26, 2017

(65) Prior Publication Data
US 2019/0128339 A1    May 2, 2019

(30) Foreign Application Priority Data
Apr. 20, 2016   (DE) .................. 10 2016 206 675

(51) Int. Cl.
*F16D 27/115*    (2006.01)
*B60K 6/387*    (2007.10)
(Continued)

(52) U.S. Cl.
CPC ............ *F16D 27/115* (2013.01); *B60K 6/387* (2013.01); *F16D 23/12* (2013.01); *F16D 27/004* (2013.01);
(Continued)

(58) Field of Classification Search
CPC ...... F16D 27/115; F16D 23/12; F16D 27/004; F16D 2023/123; B60K 6/387; B60Y 2200/92
See application file for complete search history.

(56) References Cited

U.S. PATENT DOCUMENTS 5,739,605 A    4/1998    Lazorchak
6,935,476 B2 *  8/2005    Kurmaniak ........... F16D 27/115
                                                     192/35
(Continued)

FOREIGN PATENT DOCUMENTS

CN         1651790 A     8/2005
CN       102549287 A     7/2012
(Continued)

OTHER PUBLICATIONS

DE102014213486 (Helmer Jan. 2015—machine translation).*

*Primary Examiner* — Ting Dang
(74) *Attorney, Agent, or Firm* — Kevin Parks

(57) ABSTRACT

A clutch system for a motor vehicle includes a friction clutch and a magnetic clutch. The friction clutch is for transmitting a torque between a torque-introducing element and a torque-discharging element. The magnetic clutch is for actuating the friction clutch. The magnetic clutch includes an open position and a closed position, an axially displaceable permanent magnet, and an electromagnet for axially displacing the permanent magnet between the open position and the closed position of the magnetic clutch. The electromagnet has an activated state and a deactivated state. The permanent magnet is held magnetically fixed in the open position or in the closed position of the magnetic clutch when the electromagnet is in the deactivated state.

18 Claims, 3 Drawing Sheets

(51) Int. Cl.
*F16D 23/12* (2006.01)
*F16D 27/00* (2006.01)
(52) U.S. Cl.
CPC ..... *B60Y 2200/92* (2013.01); *F16D 2023/123* (2013.01)

(56) References Cited

U.S. PATENT DOCUMENTS

| | | | | |
|---|---|---|---|---|
| 8,242,652 | B2* | 8/2012 | Genster | H02K 49/065 |
| | | | | 310/106 |
| 8,267,232 | B2* | 9/2012 | Knoblauch | F16D 27/118 |
| | | | | 192/48.2 |
| 8,814,744 | B2* | 8/2014 | Hart | F16H 3/66 |
| | | | | 475/276 |
| 8,881,882 | B2* | 11/2014 | Pardee | F16D 67/06 |
| | | | | 192/84.91 |
| 9,568,050 | B2* | 2/2017 | Takeuchi | F16D 13/648 |
| 2009/0127059 | A1 | 5/2009 | Knoblauch | |

FOREIGN PATENT DOCUMENTS

| | | |
|---|---|---|
| CN | 108138856 A | 6/2018 |
| DE | 102004039264 A1 | 2/2006 |
| DE | 102014213486 A1 | 1/2015 |
| DE | 102015008830 A1 | 1/2016 |
| DE | 102014216345 A1 | 2/2016 |
| WO | 2011050773 A1 | 5/2011 |
| WO | 2017080553 A1 | 5/2017 |

\* cited by examiner

CLUTCH SYSTEM

CROSS-REFERENCE TO RELATED APPLICATIONS

This application is the United States National Phase of PCT Appln. No. PCT/DE2017/100287 filed Apr. 10, 2017, which claims priority to German Application No. DE102016206675.7 filed Apr. 20, 2016, the entire disclosures of which are incorporated by reference herein.

TECHNICAL FIELD

The disclosure relates to a clutch system, with the aid of which a drive shaft of a motor vehicle engine can be coupled to at least one transmission input shaft of a motor vehicle transmission or to a rotor of an electric machine of a hybrid motor vehicle.

BACKGROUND

WO 2011/050773 A1 has disclosed a clutch system in the form of a so-called booster clutch, in the case of which a friction clutch, designed as a separating clutch, can be actuated with the aid of a ramp system. To close the friction clutch, the ramp system can, with the aid of a plate spring, change its axial extent by means of an output ramp that is rotatable relative to an input ramp, and thereby axially displace a pressure plate of the friction clutch. As a result, a clutch disk can be frictionally pressed between the pressure plate and a counter plate of the friction clutch.

BRIEF SUMMARY

A clutch system for coupling a drive shaft of a motor vehicle engine to at least one transmission input shaft of a motor vehicle transmission or to a rotor of an electric machine of a hybrid motor vehicle is provided, having a friction clutch, designed in particular as a multiplate clutch, for transmitting a torque between a torque-introducing element, in particular drive shaft of the motor vehicle engine, and a torque-discharging element, in particular transmission input shaft of the motor vehicle transmission or rotor of the electric machine, and a magnetic clutch for actuating, in particular via a ramp system, the friction clutch, as a result of a rotational speed difference between the torque-introducing element and the torque-discharging element. The magnetic clutch has an electromagnet and a permanent magnet which is axially displaceable between an open position and a closed position of the magnetic clutch by the electromagnet. The permanent magnet is held fixed in a magnetically adherent manner both in the closed position of the magnetic clutch and in the open position of the magnetic clutch when the electromagnet is in a deactivated state.

In regular traction operation, a torque flow can take place from the torque-introducing element to the torque-discharging element substantially via the friction clutch. As a result, a torque produced in a motor vehicle engine designed as an internal combustion engine can be transmitted to a transmission input shaft of a motor vehicle transmission in order to drive the motor vehicle. It is also possible to connect an electric machine via an output part of the friction clutch or the torque-discharging element, and therefore, in a booster mode, the motor vehicle can be additionally driven by the electric machine operated in motor mode. For purely electrical operation of the motor vehicle, with the internal combustion engine switched off, the friction clutch can be opened by virtue of the magnetic clutch which acts as pilot clutch being opened by electrical energization of the electromagnet. A torque flow between the torque-discharging element and the torque-introducing element is thereby interrupted, and therefore the drag torque of the internal combustion engine does not diminish the power introduced by the electric machine. In coasting operation, in the case of which the motor vehicle, owing to its inertia, rolls forward substantially without an input of power in a fuel-saving manner, the motor vehicle engine can be decoupled in order that the drag torque of the motor vehicle engine does not decelerate the motor vehicle. For this purpose, the friction clutch can be opened by means of the open magnetic clutch. In overrun operation, the electric machine can be operated in generator mode and recover electrical energy, while the internal combustion engine and its drag torque remain decoupled owing to the open magnetic clutch and the open friction clutch. When a greater braking power is desired, the electromagnet can be suitably electrically energized, and therefore the closing magnetic clutch closes the friction clutch and the internal combustion engine with its drag torque can act as an additional engine brake. When the friction clutch is in a closed state, it is also possible to use the electric machine to introduce a starting torque for starting the internal combustion engine. In order to change over between the individual operating modes, it is sufficient to switch the magnetic clutch, and decouple or couple the internal combustion engine, by means of the electrical energization of the electromagnet.

The permanent magnet that can be caused to interact with the electromagnet may be part of an armature disk, which can be displaced by the electromagnet between the open position and the closed position of the magnetic clutch in order to couple the friction clutch to the torque-introducing element when the magnetic clutch is in the closed position. By means of the armature disk that is magnetically held fixed both in the open position and in the closed position, the magnetic clutch is of bistable configuration. The magnetic clutch can thus, both in the open position and in the closed position, maintain its state without the electromagnet having to be electrically energized for this purpose. In fact, it is possible for the electromagnet to be electrically energized only for the purposes of switching the magnetic clutch, in order to exert an attracting or repelling magnetic force on the armature part for the changeover between the closed position and open position. Here, in the case of the magnetic clutch, it is sufficient for at least one permanent magnet to be provided in the armature disk, such that it is not necessary to provide a permanent magnet in the components that are magnetically contacted by the armature disk. Here, use is made of the realization that a coupling and decoupling of a motor vehicle engine is normally performed with such a low frequency in a time interval that the energy use of the electromagnet to overcome the magnetic force of the permanent magnet in the open position and in the closed position is, averaged over time, lower than in the case of permanent electrical energization in the open position or in the closed position in order to maintain the respective switching state of the magnetic clutch. The energy demand for the magnetic clutch can thus be reduced. Since the electromagnet is only briefly electrically energized for the changeover of the switching state of the magnetic clutch, it is furthermore possible to avoid warming of the conductive windings of the electromagnet. The electrical energization of the electromagnet may be performed in this case over a time period of 1 ms to 100 ms. A decrease in efficiency of the magnetic clutch as a result of a warming-up electromagnet can thus be avoided, such that it is possible to reduce an intentional overdimensioning of the electromagnet without jeopardizing the proper operation of the clutch system. For the changeover of the operating modes, it is merely necessary for the electromagnet to be briefly electrically energized in order to switch the magnetic clutch which is of bistable configuration, such that an easy and efficient adaptation of a transmission of torque in a drivetrain, in particular of a hybrid motor vehicle, to different drive strategies is made possible with little energy usage.

The magnetic clutch and the friction clutch, together with a ramp system connected in between, can form a so-called booster clutch. In the closed state of the friction clutch, the torque-introducing element and the torque-discharging element have substantially the same speed in slip-free operation. In the open state of the friction clutch, the torque-introducing element and the torque-discharging element can rotate at different rotational speeds, with the result that a rotational speed difference arises between the torque-introducing element and the torque-discharging element. The torque flowing via the torque-introducing element and the friction clutch can flow at least partially via the closed magnetic clutch, allowing a transmission of torque from the magnetic clutch via the ramp system to the friction clutch at least temporarily in the closed state of the magnetic clutch, thereby making it possible to reduce component loads. In particular, the magnetic clutch brings about frictional engagement, possibly with slippage, between the torque-introducing element and the torque-discharging element when the input ramp is rotated relative to the output ramp. If, when the magnetic clutch is in a closed state, rotational speed equalization between the torque-introducing element and the torque-discharging element has not yet occurred, the magnetic clutch can convert the rotational speed difference into a relative rotation of the input ramp with respect to the output ramp by means of suitable coupling of the ramp system to the magnetic clutch. It is thereby possible to change the axial extent of the ramp system on the basis of the rotational speed difference within the magnetic clutch and thus on the basis of the rotational speed difference between the torque-introducing element and the torque-discharging element. At the same time, it is also possible for a torque to be transmitted, which torque can be passed on to the ramp system in order to provide a correspondingly high contact force for a pressure plate, which can be displaced by the ramp system, of the friction clutch. By means of the changing extent of the ramp system, the pressure plate can be displaced in order to close the friction clutch. A displacement force for displacing the pressure plate can be derived from the torque transmitted via the magnetic clutch. Once the extent of the ramp system has changed to the extent that, for example, the pressure plate clamps a clutch disk and/or plates of a multiplate clutch, ending of the slipping mode is followed by synchronization of the rotational speeds of the torque-introducing element and of the torque-discharging element, with the result that there is no longer a speed difference. The ramp system can then remain in the attained position.

In the closed position of the friction clutch, the predominant part of the torque to be transmitted can take place via the friction pairing(s) in the friction clutch. A smaller proportion of the torque to be transmitted can be transmitted via the magnetic clutch. As a result, it is possible to introduce a correspondingly high contact force into the friction clutch via the magnetic clutch, thus enabling a correspondingly higher torque to be transmitted reliably and without slippage. Here, a force multiplication can be achieved through a suitable choice of ramp gradient of the ramp system, thus making it possible to achieve an increased multiplied contact force with a low actuating force for the actuation of the magnetic clutch. Moreover, a part of the torque to be transmitted can be used to provide the contact force, and therefore the contact force can be supplied from an additional energy source. By virtue of the fact that the actuating force engages on the pressure plate indirectly via the magnetic clutch, force intensification and/or torque derivation from the torque to be transmitted can be achieved, for the purposes of closing the friction clutch, by means of the magnetic clutch, and therefore the friction clutch can be closed frictionally using a significantly increased contact force, thereby allowing reliable closure of the friction clutch with low design complexity.

The armature disk may have armature parts which make contact with the permanent magnet and which are produced from a material receptive to magnetic forces, for example a ferromagnetic, magnetically soft or magnetically hard, material. In the closed position and in the open position, the armature disk can, with a magnetic force generated by the permanent magnet, be pressed against a ferromagnetic component with a contact force such that a firm hold with magnetically adherent action is realized. Said contact force can be overcome by the electromagnet, in order to switch the magnetic clutch, by means of an attractive or repelling magnetic force. The electromagnet may have a coil through which electrical current can flow and which is in particular wound around an iron core. The permanent magnet is for example fastened rotationally conjointly to the armature parts. The friction clutch may be used in particular for a manual transmission of a motor vehicle. By means of the friction clutch, a "clutch-by-wire" system can be implemented, in the case of which the actuation of the friction clutch is performed not by mechanical, hydraulic or pneumatic means but electrically. The friction clutch may thus be designed as an "e-clutch".

In particular, the permanent magnet is arranged so as to be at least partially magnetically coupled between a magnetically soft first armature part and a magnetically soft second armature part in an axial direction. By means of the armature part, the magnetic field of the permanent magnet can be easily conducted to a desired location. Here, the permanent magnet, which is generally rather brittle and difficult to machine, can have a simple shape, whereas the armature part, which is easier to machine, may have a correspondingly more complex geometry for the desired magnetic field. For example, the permanent magnet is designed as a ring or ring segment with radially inwardly and radially outwardly pointing poles, whereas the at least one armature part diverts the magnetic field substantially into an axial direction.

Both the first armature part and the second armature part may be held fixed in a magnetically adherent manner in the closed position and/or in the open position. A magnetic flux of the permanent magnet can run through the armature parts, such that direct contact between the permanent magnet and the magnetically adherent components is avoided. The permanent magnet is thereby protected against damage as a result of impacts, whereas the armature parts can be produced from a more ductile material than the permanent magnet. Furthermore, the armature parts together with the permanent magnet may permit a defined field line profile, which permits for example a deliberate orientation of the north pole and of the south pole of the armature disk, such that, depending on the current direction of the electrical current supplied to the electromagnet, the armature disk can be attracted or repelled by the electromagnet.

The permanent magnet may be adhesively bonded to and/or cast with the first armature part and/or the second armature part. In this way, the relative position of the permanent magnet with respect to the armature part can be easily fixed. In particular, it is possible for direct contact to be provided between the permanent magnet and the armature part, and for the material used for fixing purposes to be provided outside the contact area in the manner of an at least partial encasement of the overall unit composed of the permanent magnet and the armature part. A disruption of the magnetic field at the transition of the permanent magnet to the armature part owing to an additional dielectric can thereby be avoided.

In particular, a restoring spring designed in particular as a leaf spring is provided for automatically moving the permanent magnet into a defined initial position, which in particular corresponds to the open position, when the electromagnet is in a deactivated state. In particular, the restoring spring is indirectly or directly fastened in torque-transmitting fashion to the torque-introducing element. The restoring spring can, in the initial position, predefine a certain contact force, in particular in order to be able to transmit an adequately large torque in the closed position. In this way, a correspondingly lower magnetic force of the permanent magnet is sufficient. In that end position of the armature disk which differs from the initial position, in particular in the open position, the magnetic force of the permanent magnet can be high enough to compensate the spring force of the restoring spring. By virtue of the restoring spring being embodied as a leaf spring, an axial relative movement of the armature disk is made possible, whereas, at the same time, the restoring spring can, in the closed position, transmit the torque required for actuating the friction clutch. Here, the torque flow can pass from the torque-introducing element via the restoring spring and the armature disk.

A ramp system may be provided for the axial displacement of a pressure plate of the friction clutch. The ramp system has an input ramp and an output ramp which is rotatable relative to the input ramp for the purposes of varying an axial extent of the ramp system. The output ramp is coupled to the torque-introducing element, and the input ramp is couplable by means of the magnetic clutch to the torque-discharging element, or the output ramp is coupled to the torque-discharging element, and the input ramp is couplable by means of the magnetic clutch to the torque-introducing element. By means of the ramp gradient of the ramps of the ramp system, a force intensification can be achieved, with the result that the actuating force required to close the magnetic clutch is significantly lower than the contact force which can be achieved at the pressure plate. As a result, the electromagnet can be of significantly smaller and more space-saving dimensions than if the electromagnet had to displace the pressure plate directly. It is furthermore possible to relocate the magnetic clutch out of the region of the pressure plate. The output ramp can be coupled rotationally conjointly but axially movably to the torque-discharging element. As a result, the output ramp, which is coupled to the torque-discharging element, and the input ramp, which is couplable to the torque-introducing element by means of the magnetic clutch, can be rotated relative to one another when there is a rotational speed difference between the torque-discharging element and the torque-introducing element. Alternatively, the output ramp may be coupled to the torque-introducing element in an axially displaceable but torque-transmitting manner, while the input ramp is couplable rotationally conjointly to the output part of the friction clutch and/or to the torque-discharging element. The ramps of the ramp system can slide directly on one another or can be rotated relative to one another by way of at least one ball, a cylinder or some other rotatable element, thus enabling a ball-ramp system to be formed. By means of the rotation of the ramps relative to one another, the distance between the rear sides of the input ramp and output ramp facing away from the other, opposite ramp in each case can change, allowing the axial extent of the ramp system to decrease or increase accordingly. The maximum relative angle of rotation of the input ramp with respect to the output ramp may be, for example, limited by at least one stop, thereby, for example, making it possible to avoid an exceedance of a maximum range of wear of friction linings of the friction clutch.

The input ramp may be fastened rotationally conjointly to a driver produced from a ferromagnetic, in particular magnetically soft, material. The permanent magnet magnetically adheres to the driver in the closed position of the magnetic clutch when the electromagnet is in a deactivated state. The ramp system can thus be provided at a distance from the magnetic clutch. The driver may for example be coupled in torque-transmitting fashion to the input ramp by means of a spline toothing. Here, the ferromagnetic driver can ensure the magnetically adherent coupling to the armature disk, whereas the input ramp can be produced from a different material. In particular, the driver is mounted by means of a radial bearing, designed in particular as a rolling-body bearing, on the torque-introducing element. The radial bearing can be bypassed by the magnetic clutch. The driver can thus be supported on the torque-introducing element, such that tilting of the driver with respect to a radial plane through the magnetically adherent armature disk in the closed position can be avoided.

In particular, a friction disk which is coupled in torque-transmitting fashion to the torque-introducing element is provided in an axial direction between the permanent magnet and the electromagnet for the purposes of producing magnetic contact with the permanent magnet. The permanent magnet magnetically adheres to the friction disk in the open position of the magnetic clutch when the electromagnet is in a deactivated state. The armature disk can be pressed by the permanent magnet against the friction disk in order to effect adherent magnetic contact. Slipping frictional contact with the electromagnet is thereby avoided. Instead, the armature disk and the friction disk can co-rotate with the same rotational speed without relative rotation in the open position.

The electromagnet may be connected to a direct-current source, and the direct-current source can provide a direct current in a first current direction and a direct current in a second current direction that is opposite to the first current direction. In particular, the current intensity of the direct current is variably adjustable. Depending on the current direction, a magnetic force that repels or attracts permanent magnets can be generated by the electromagnet. In the case of the attractive magnetic force, the magnetic clutch can be opened. In the case of the repelling magnetic force, the magnetic clutch can be closed.

A rotor of an electric machine may be connected to an output part of the friction clutch and/or to the torque-discharging element. As a result, the clutch system can be easily used as a hybrid module for a hybrid motor vehicle, in order to exchange power between the electric machine and the torque-discharging element. The rotor has in particular permanent magnets, which can interact with electromagnets of a stator of the electric machine, in order to realize a motor mode and a generator mode depending on the desired operating mode.

In particular, an output part of the friction clutch and/or the torque-discharging element has an integrated radial offset compensator, in particular a torque sensor. As a result, the opening and closing of the friction clutch by means of a rotational speed difference present at the magnetic clutch can take place more smoothly. Moreover, a relative rotation of involved component parts of the magnetic clutch and of the friction clutch that occurs for the actuation of the friction clutch can be automatically compensated. In particular, a spring element can be preloaded by the torque acting in the radial offset compensator during the closure of the friction clutch, with the result that the preloaded spring element can automatically open the friction clutch when the applied torque is no longer present. A changeover between overrun operation and traction operation can thereby be achieved in a simple manner, without the need for the action of an external controller on the friction clutch or the magnetic clutch.

The disclosure also relates to a drivetrain for a motor vehicle with a torque-introducing element, in particular a drive shaft of the motor vehicle engine, a torque-discharging element, in particular a transmission input shaft of the motor vehicle transmission, a clutch system, which can be embodied and refined as described above, for transmitting a torque between the torque-introducing element and the torque-discharging element, and an electric machine for transmitting a torque between the electric machine and the torque-discharging element. For the changeover of the operating modes, it is merely necessary for the electromagnet to be briefly electrically energized in order to switch the magnetic clutch which is of bistable configuration, such that an easy and efficient adaptation of a transmission of torque in a drivetrain, in particular of a hybrid motor vehicle, to different drive strategies is made possible with little energy usage.

BRIEF DESCRIPTION OF THE DRAWINGS

The disclosure is explained below with reference to the accompanying drawings on the basis of exemplary embodiments by way of example, the features that are presented below each being able to represent an aspect of the disclosure individually or in combination. In the figures.

DETAILED DESCRIPTION

Figure 1:
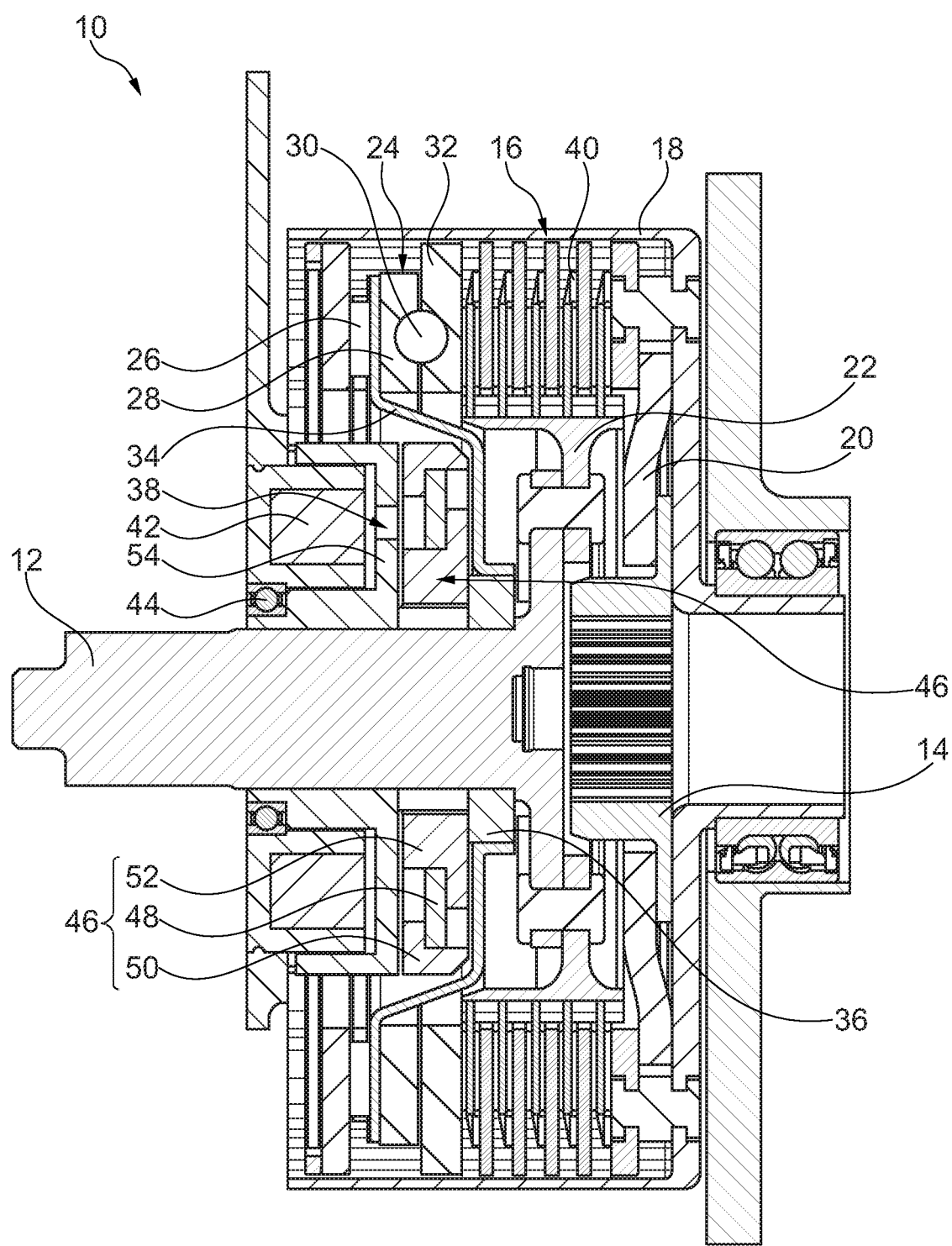
FIG. 1: shows a schematic sectional view of a clutch system.
Figure 2:
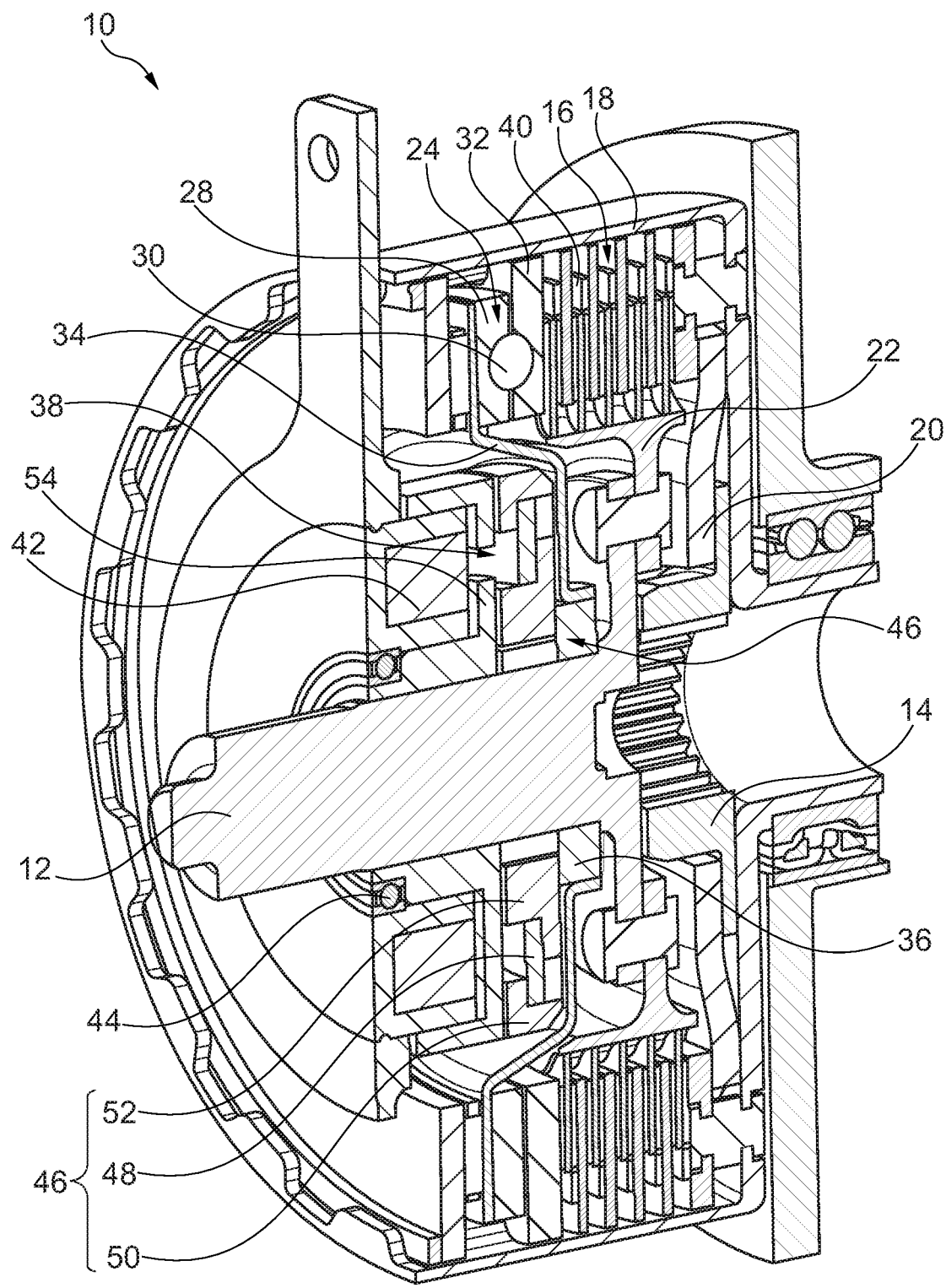
FIG. 2: shows a schematic perspective sectional view of the clutch system from FIG. 1, FIG. 3: shows a schematic detail view of a magnetic clutch of the clutch system from FIG. 1, FIG. 4: shows a schematic detail view of the magnetic clutch from FIG. 3 in the open state.

The clutch system 10 illustrated in FIG. 1 and FIG. 2 has a torque-introducing element 12 in the form of a drive shaft, designed as a crankshaft, of a motor vehicle engine, which torque-introducing element can be coupled for example to a torque-discharging element 14 in the form of a transmission input shaft of a motor vehicle transmission. The torque-discharging element 14 may also be acted on by an electric machine for the purposes of exchanging a torque. For this purpose, the electric machine has a stator which can be flowed through by electrical current and which can interact with a rotor coupled to the torque-discharging element 14. The torque-discharging element may possibly have magnets which interact with the stator, and thereby form the rotor of the electric machine. A separating clutch may be provided between the torque-introducing element 12 and the motor vehicle engine and/or between the torque-discharging element 14 and the motor vehicle transmission, in order to be able to shift gear ratios in the motor vehicle transmission while the motor vehicle engine is running.

The torque-introducing element 12 may be coupled via a friction clutch 16, designed as a multiplate clutch, to the torque-discharging element 14. For this purpose, the friction clutch 16 has an output part 18 which is designed as an outer plate carrier and which is coupled, via a compensating element 20 for compensating an offset in a radial direction and/or in a circumferential direction, to the torque-discharging element 14. In particular, the output part 18 may, radially at the outside, bear a stator of the electric machine and be equipped with stator permanent magnets for forming the stator. Furthermore, the friction clutch 16 has an input part 22 which is riveted to the torque-introducing element 12 and which is designed as an inner plate carrier. The friction clutch 16 can be actuated by means of a ramp system 24. For this purpose, the ramp system 24 has an input ramp 28, which is supported in an axially immovable manner by means of an axial bearing 26 and which can be rotated relative to an output ramp 32 by means of a ball 30. The output ramp 32 can thereby be axially displaced in order, as a pressure plate of the friction clutch 16, to clamp the friction and/or steel plates of the friction clutch 16 during a closure of the friction clutch 16.

The input ramp 28 is engaged on by a pot-like driver 34, with the aid of which the input ramp 28 can be rotated. The driver 34 is rotatably mounted on the torque-introducing element 12 by means of a radial bearing 36. With the aid of a magnetic clutch 38, the radial bearing 36 can be bypassed, and the driver 34 can be coupled to the torque-introducing element 12. When the friction clutch 16 is open and the magnetic clutch 38 is closed, the input ramp 28 is coupled via the driver 34 to the torque-introducing element 12, whereas the output ramp 32 is coupled via the output part 18 to the torque-discharging element 14, such that, owing to a rotational speed difference between the torque-introducing element 12 and the torque-discharging element 14, the input ramp 28 can be rotated relative to the output ramp 32. In particular in the case of an overtaking torque-introducing element 12, it is possible here for the axial extent of the ramp system 24 to be increased, and the friction clutch 16 closed. If the magnetic clutch 38 is open, the input ramp 28 is no longer supported via the relatively rotatably mounted driver 34. The friction clutch 16 can thus automatically open, and reduce the axial extent of the ramp system 24, owing to prestressed restoring spring elements 40 designed for example as corrugated springs.

Figure 3:
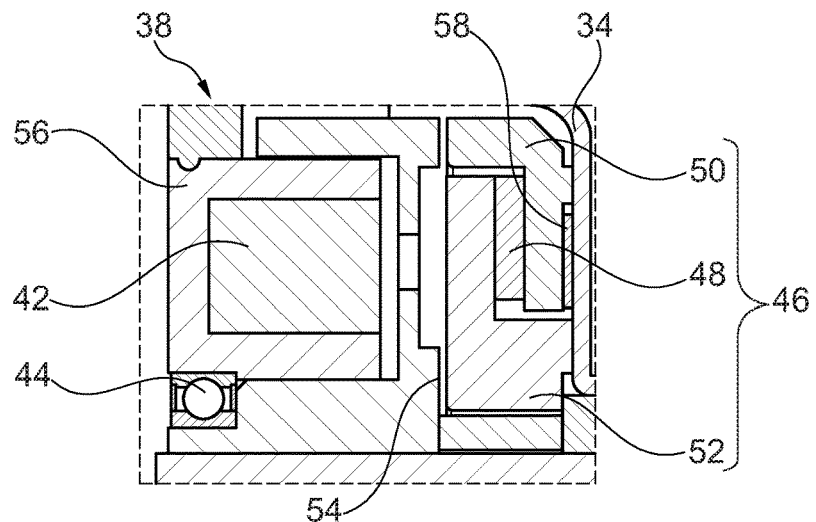

The magnetic coupling 38 illustrated in detail in FIG. 3 has a static electromagnet 42, on which the torque-introducing element 12 is mounted by means of a radially inner shaft bearing 44. The electromagnet 42 can generate an electrical field that can act on an axially displaceable armature disk 46. In the exemplary embodiment illustrated, the armature disk 46 has a permanent magnet 48, which is attached magnetically to a magnetically soft first armature part 50 and to a magnetically soft second armature part 52.

Figure 4:
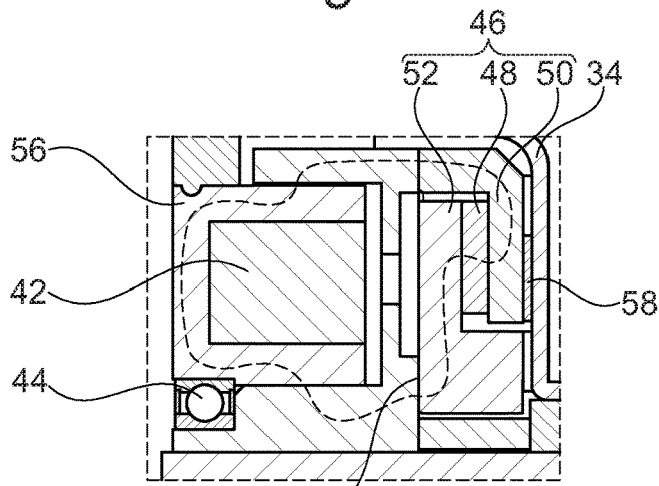

In the open position of the magnetic clutch 38 illustrated in FIG. 4, the armature disk 46 is pressed against a friction disk 54 which is connected rotationally conjointly to the torque-introducing element 12. Here, the permanent magnet 48 exhibits a magnetic flux which runs through the magnetically soft material of the friction disk 54 and possibly through a magnetically soft housing 56 for the electromagnet 42. The first armature part 50 and the second armature part 52 make direct contact with the friction disk 54, such that the armature disk 46 magnetically adheres to the friction disk 54 and is thus held magnetically fixed on the friction disk 54. Here, the magnetic force imparted by the permanent magnet 48 can be great enough to be able to compensate a spring force which is imparted by a restoring spring 58 designed as a leaf spring and which pulls the armature disk 46 away from the friction disk 54 in the direction of the driver 34.

Figure 5:
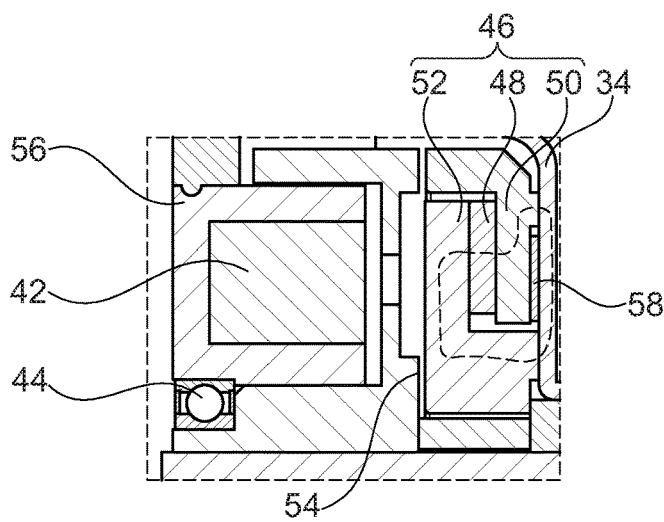
FIG. 5: shows a schematic detail view of the magnetic clutch from FIG. 3 in the closed state.

To switch the magnetic clutch 38 from the open position illustrated in FIG. 4 into the closed position illustrated in FIG. 5, the electromagnet 42 briefly exerts a repelling magnetic force on the permanent magnet 48 of the armature disk 46. The armature disk 46 can thus lift off from the friction disk 54 and be pressed by the repelling magnetic force of the electromagnet 42 and the spring force of the restoring spring 58 against the driver 34. Here, the permanent magnet 48 exhibits a magnetic flux which runs through the magnetically soft material of the driver 34. The first armature part 50 and the second armature part 52 make direct contact with the driver 34, such that the armature disk 46 magnetically adheres to the driver 34, and is thus held magnetically fixed on the driver 34, even when the electromagnet 42 is deactivated. By means of the restoring spring 58 and the armature disk 46, a torque can then be transmitted to the driver 34 in order to increase the axial extent of the ramp system 24 and close the friction clutch 16. At the latest after a synchronization of the torque-discharging element 14 with the torque-introducing element 12, the electromagnet 42 can be deactivated. In particular, the electromagnet 42 may be deactivated already when the armature disk 46 has made contact with the driver, or, owing to the axial position of the armature disk 46, an undesired switch back into the open position can be ruled out owing to the prevailing magnetic forces.

To switch the magnetic clutch 38 from the closed position illustrated in FIG. 5 into the open position illustrated in FIG. 4 again, the electromagnet 42 briefly exerts an attracting magnetic force on the permanent magnet 48 of the armature disk 46. The armature disk 46 can thus lift off from the driver 34 and be pressed by the attracting magnetic force of the electromagnet 42, counter to the spring force of the restoring spring 58, against the friction disk 54, where the armature disk 46 is held fixed in a magnetically adherent manner even when the electromagnet 42 is deactivated.

LIST OF REFERENCE DESIGNATIONS

10 Clutch system
12 Torque-introducing element
14 Torque-discharging element
16 Friction clutch
18 Output part
20 Compensation element
22 Input part
24 Ramp system
26 Axial bearing
28 Input ramp
30 Ball
32 Output ramp
34 Driver
36 Radial bearing
38 Magnetic clutch
40 Restoring spring element
42 Electromagnet
44 Shaft bearing
46 Armature disk
48 Permanent magnet
50 First armature part
52 Second armature part
54 Friction disk
56 Housing
58 Restoring spring

The invention claimed is:

1. A clutch system for a motor vehicle comprising:
   a friction clutch for transmitting a torque between a torque-introducing element and a torque-discharging element;
   a magnetic clutch for actuating the friction clutch, the magnetic clutch comprising:
      an open position and a closed position;
      an axially displaceable permanent magnet; and,
      an electromagnet for axially displacing the permanent magnet between the open position and the closed position of the magnetic clutch; and
   a magnetically soft first armature part; and,
   a magnetically soft second armature part, wherein:
      the electromagnet comprises an activated state and a deactivated state;
      the permanent magnet is held magnetically fixed in the open position or in the closed position of the magnetic clutch when the electromagnet is in the deactivated state; and
      the permanent magnet is arranged to be at least partially magnetically coupled between the magnetically soft first armature part and the magnetically soft second armature part in an axial direction.

2. The clutch system of claim 1, wherein the first armature part and the second armature part are held fixed in a magnetically adherent manner in the open position and the closed position of the magnetic clutch.

3. The clutch system of claim 1, wherein:
   the permanent magnet is adhesively bonded to the first armature part or the second armature part; or,
   the permanent magnet is cast with the first armature part or the second armature part.

4. The clutch system of claim 1, further comprising:
   a restoring spring for moving the permanent magnet into a defined initial position when the electromagnet is in the deactivated state, wherein the restoring spring is fastened to the torque-introducing element in torque-transmitting fashion.

5. The clutch system of claim 1, further comprising:
   a ramp system comprising an input ramp and an output ramp, wherein:
      the friction clutch comprises a pressure plate;
      the output ramp is rotatable relative to the input ramp to vary an axial extent of the ramp system; and,
      the ramp system is arranged to axially displace the pressure plate.

6. The clutch system of claim 5 wherein:
   the output ramp is coupled to the torque-introducing element and the input ramp is couplable to the torque-discharging element by the magnetic clutch; or
   the output ramp is coupled to the torque-discharging element, and the input ramp is couplable to the torque-introducing element by the magnetic clutch.

7. The clutch system of claim 5, further comprising a driver produced from a ferromagnetic material, wherein:

the input ramp is rotationally fixed to the driver; and,
the permanent magnet is magnetically adhered to the driver in the closed position of the magnetic clutch when the electromagnet is in the deactivated state.

8. The clutch system of claim 1, further comprising a friction disk axially between the permanent magnet and the electromagnet for magnetically contacting the permanent magnet, wherein:
the friction disk is coupled to the torque-introducing element in torque-transmitting fashion; and,
the permanent magnet is magnetically adhered to the friction disk in the open position of the magnetic clutch when the electromagnet is in the deactivated state.

9. The clutch system of claim 1, further comprising a direct current source, wherein:
the electromagnet is connected to the direct current source; and,
the direct current source can provide a direct current in a first current direction and a direct current in a second current direction that is opposite to the first current direction.

10. A magnetic booster clutch for a clutch system comprising:
an electromagnet;
a friction disk;
a driver for operating a ramp system;
an axially displaceable armature disk comprising:
a first armature part;
a second armature part; and,
a permanent magnet disposed axially between and in contact with the first armature part and the second armature part; wherein:
for a first axial position of the armature disk, a first magnetic flux from the permanent magnet extends through the first armature part, the friction disk, and the second armature part; and,
for a second axial position of the armature disk, a second magnetic flux from the permanent magnet extends through the first armature part, the driver, and the second armature part.

11. The magnetic booster clutch of claim 10 wherein:
for the first axial position of the armature disk, the first armature part and the second armature part each contact the friction disk; and,
for the second axial position of the armature disk, the first armature part and the second armature part each contact the driver.

12. The magnetic booster clutch of claim 10 further comprising an electromagnet housing, wherein, for the first axial position of the armature disk, the first magnetic flux extends through the electromagnet housing.

13. The magnetic booster clutch of claim 10 further comprising:
an input element; and,
a restoring spring rotationally fixed to the input element, wherein, for the second axial position of the armature disk, the restoring spring is compressed between the armature disk and the driver and transmits a torque from the input element to the driver.

14. The magnetic booster clutch of claim 10 wherein:
the electromagnet exerts a repelling force on the armature disk to displace the armature disk from the first axial position to the second axial position and the electromagnet exerts an attractive force on the armature disk to displace the armature disk from the second axial position to the first axial position; or,
the electromagnet exerts an attractive force on the armature disk to displace the armature disk from the first axial position to the second axial position and the electromagnet exerts a repelling force on the armature disk to displace the armature disk from the second axial position to the first axial position.

15. The magnetic booster clutch of claim 14 wherein:
after the armature disk is displaced by the electromagnet to the first axial position, the armature disk remains in the first axial position after the attractive force or the repelling force is removed; and,
after the armature disk is displaced by the electromagnet to the second axial position, the armature disk remains in the second axial position after the attractive force or the repelling force is removed.

16. The magnetic booster clutch of claim 10 wherein:
the permanent magnet has a ring shape;
the first armature part surrounds a radially outer diameter of the permanent magnet; and,
the second armature part surrounds a radially inner diameter of the permanent magnet.

17. The magnetic booster clutch of claim 10 wherein:
the friction disk comprises a first ring-shaped axial protrusion at least partially aligned with the first armature part; and,
the friction disk comprises a second ring-shaped axial protrusion at least partially aligned with the second armature part.

18. A clutch system comprising:
a friction clutch;
the magnetic booster clutch of claim 10; and,
the ramp system for engaging the friction clutch when the armature disk is in the second axial position.

* * * * *